United States Patent Office 3,189,591
Patented June 15, 1965

3,189,591
PROCESS FOR POLYMERIZING ALPHA-OLEFINS WITH AN ORGANO ALUMINUM COMPOUND, TRANSITION METAL HALIDE, ORGANO NITROGEN BASE AND WATER CATALYST
Renato Serra and Ettore Giachetti, Milan, Italy, assignors to Montecatini, Società Generale per l'Industria Mineraria e Chimica, a corporation of Italy
No Drawing. Filed Apr. 24, 1961, Ser. No. 104,851
Claims priority, application Italy, Apr. 28, 1960, 7,555/60
17 Claims. (Cl. 260—93.7)

The present invention relates to an improved process for the polymerization of alpha-olefins to polymers made up at least prevailingly of isotactic macromolecules and to catalysts which are particularly active in promoting said polymerization.

It is known that the activity of highly selective catalytic systems comprising organic compounds of metals belonging to the first, second or third group of the Periodic Table according to Mendeleeff and halides of transition metals possessing valences less than their highest, which catalysts promote the stereospecific polymerization of alphaolefins to polymers made up at least prevailingly of isotactic macromolecules, can be remarkably increased by addition of a compound which is an organic base according to Lewis' theory of acid and bases, more particularly a nitrogen containing organic base, to the catalytic system.

Some examples of these transition metal halides are compounds such as the chlorides, bromides and iodides of metals such as titanium, zirconium, chromium, molybdenum, vanadium, hafnium, thorium, tungsten, niobium, tantalm, uranium and iron.

As the organic compounds of metals belonging to the first, second, or third group of the Periodic Table may be mentioned the alkyls, such as ethyl, proply, butyl, etc., of aluminum, beryllium, magnesium, zinc and cadmium. One valence of these metals may be also satisfied by a halogen, e.g., a bromine, chlorine or iodine atom, or by alkoxy radical, such as ethyoxy, propoxy, etc.

The polymer obtained using such a catalyst generally possesses a higher crystallinity than polymers obtained from catalysts lacking said organic bases.

We have now surprisingly found that, when said organic base is mixed with $H_2O$ in given ratios, the activity of the catalyst thus obtained is remarkably increased over the activity of the corresponding catalyst which has been activated with an anhydrous organic base.

On the other hand, it has been ascertained that, when the same amount of water is added directly to the transition metal halide in the absence of the organic base, a decrease in the catalytic activity of the system is noted whereas, when water is added directly to the organo-metallic compound, no noticeable effect is observed in the polymerization.

This fact leads applicant to theorize that the increased catalytic activity is caused by a compound probably of the dionium hydrate type, derived from the combination of the base+water. The existence of these compounds has already been hypothesized by several authors based on the determination of the electric properties of systems containing base+$H_2O$ and base+$H_2O$+solvent, but these compounds have never been isolated.

An object of the present invention is, therefore, to provide a process for the polymerization of alpha-olefins to polymers composed at least prevalingly of isotactic macromolecules in the presence of catalysts containing an organic compound of a metal belonging to the first, second or third group of the Mendeleeff Periodic Table and at least one transition metal halide having a valence less than its highest, characterized in that a complex compound, obtained by treating a nitrogen-containing organic base with an amount of water varying from 0.1 to 1 mole of water per mole of the organic base, is added to the catalytic system.

The organic nitrogen-containing bases which are preferably used are pyridine and diethylamine.

However, any other organic nitrogen containing base selected from the group consisting of aliphatic amines, polyamines (e.g., trimethyl amine, mono-, di- and tributylamine, ethylene diamine, propylene diamine, etc.), aromatic amines (e.g., aniline, methyl aniline, diphenylamine, phenylene diamine, etc). and heterocyclic tertiary bases (pyridine, quinoline, isoquinoline, etc.) can successfully be used.

The complex compound obtained by treating the organic base with water is preferably added to the transition metal halide before contacting the latter with the organometallic compound belonging to the first, second or third group of the Periodic Table.

It has also been found that the highest activity of the catalyst is obtained when prepared in a reduced volume of solvent with respect to the total polymerization volume (preferably 1 to 10 g. $TiCl_3$/100 ml. solvent) and that the highest increase of activity, based on the activity of the anhydrous base, is obtained by using (for the preparation of the catalyst) hydrocarbon solvents in which water has a relatively high solubility. More particularly, the use of aromatic solvents, particularly benzene, rather than paraffinic saturated solvents, is preferred.

A further object of the present invention is the providing of catalysts particularly active in promoting the polymerization of alpha-olefins to polymers made up at least prevailingly of isotactic macromolecules. These catalysts comprise, according to the present invention, an organic compound of a metal belonging to the first, second or third group of the Periodic Table, at least one transition metal halide having a valence less than the highest, and a compound formed by treating a nitrogen-containing organic base with water in certain given ratios.

The preferred molar ratios between the catalyst components are as follows: between 0.25 to 1 and 1.0 to 1, preferably 0.5 to 1, for the $H_2O$/base ratio; between 0.125 to 1 and 1.0 to 1, preferably 0.5 to 1 for the pyridine/$TiCl_3$ ratio; and between 0.1 to 1 and 0.5 to 1, preferably between 0.15 to 1 and 0.3 to 1 for the transition metal halide/organometallic compound ratio.

The corresponding polymer obtained using the catalyst and process of the present invention possesses, in general, the same characteristics as the one obtained by using a perfectly anhydrous base.

The following examples are given as illustrative of the present invention and are not limitative thereof.

EXAMPLES I TO XIV

Into a 6-liter autoclave, provided with a mechanical agitator and maintained at a temperature of 75° C. by means of oil circulation, are introduced the following—3.1 liters of heptane, which have been dried on $Al_2O_3$, and the catalyst prepared "in vitro" according to the following procedure:

The amounts of either anhydrous or hydrated pyridine reported in Table 1 are added, while maintaining agitation, to 1.4 g. of $TiCl_3$, which has been placed under nitrogen in a flask containing 25 ml. of benzene. The mixture is kept at room temperature for about 15 minutes and 6.2 g. of $Al(C_2H_5)_3$ are then added.

The catalyst thus prepared is introduced into an autoclave by syphoning. Gaseous propylene is then introduced up to a pressure of 7 atmospheres, which pressure is then kept constant during the run by the continuous introduction of propylene.

After five hours, the autoclave is discharged and the polymer thus obtained is coagulated with pure methanol. The polymer is then washed first with methanol which has been acidified with hydrochloric acid and then with pure methanol.

The polymer is dried at 70° C. under vacuum and is then weighed. Its intrinsic viscosity (in tetrahydronaphthalene is 135° C.) and the percent of the residue after an extraction with boiling heptane are then determined.

The results of the runs along with the aforementioned determinations are reported in Table 1.

*Table 1*

[PROPYLENE POLYMERIZATION RUNS CARRIED OUT AT 75° C. AND 7.5 ATM. OF $C_3H_6$ WITH 1.4 G. OF $TiCl_3$, 6.2 G. of $Al(C_2H_5)_3$ IN 3.1 LITERS OF HEPTANE]

| Run No. | Pyridine/$TiCl_3$, ratio by mols | $H_2O$/pyridine by mols | $H_2O$/$TiCl_3$ by mols | G. of polymer/g. of $TiCl_3$×hour | Residue after heptane extract, percent by weight | $[\eta]$ |
|---|---|---|---|---|---|---|
| 1 | 0.5 | | | 60.0 | 88.9 | 4.1 |
| 2 | | | | 34.5 | 82.8 | 3.8 |
| 3 | | | 0.33 | 24.0 | 82.2 | 3.4 |
| 4 | | | 0.66 | 16.5 | 80.5 | 2.9 |
| 5 | | | 1.25 | (1) | | |
| 6 | 0.125 | 0.25 | 0.033 | 54.0 | (2) | (2) |
| 7 | 0.250 | 0.25 | 0.066 | 80.0 | 89.0 | 4.4 |
| 8 | 0.500 | 0.25 | 0.125 | 98.0 | 87.5 | 3.8 |
| 9 | 0.125 | 0.50 | 0.066 | 43.0 | 88.1 | (2) |
| 10 | 0.250 | 0.50 | 0.125 | 71.0 | 86.3 | 3.2 |
| 11 | 0.500 | 0.50 | 0.250 | 102.0 | 87.5 | 4.3 |
| 12 | 0.125 | 1.00 | 0.125 | 26.0 | (2) | (2) |
| 13 | 0.250 | 1.00 | 0.250 | 52.5 | 86.5 | 2.4 |
| 14 | 0.500 | 1.00 | 0.500 | 77.0 | 85.5 | 4.3 |

[1] Traces of polymer.
[2] Not determined.

EXAMPLE XV

Into a 6-liter autoclave kept at 70° C. by means of oil circulation and containing 0.2 liter of heptane, a catalyst (prepared "in vitro" by mixing 2.5 g. of $TiCl_3$ in 25 ml. of benzene with 0.70 g. of hydrated pyridine (water/pyridine molar ratio=0.5) and then adding, after allowing the mixture to remain at room temperature for 15 minutes, 6.0 of $Al(C_2H_5)_3$ is introduced. 2.0 liters of butene-1 are then introduced into the autoclave and are polymerized at a temperature of 70° C.

After four hours, the polymer is discharged, coagulated with methanol, washed first with methanol acidified with hydrochloric acid and then with pure methanol and finally dried at 60° C. under vacuum.

1100 g. of polybutene having an intrinsic viscosity of 1.9 (determined in tetrahydronaphthalene at 135° C.) and a residue after an ethyl ether extraction of 82.1%, are obtained.

In a similar run, carried out under the same conditions but using anhydrous pyridine, which pyridine has been distilled and kept on KOH prior to use, 200 g. of polybutene, having an intrinsic viscosity of 2.2 and a residue after an ethyl ether extraction of 78.5%, are obtained.

EXAMPLE XVI

The catalyst prepared by contacting, for a period of 15 minutes at room temperature, 1.0 g. of $TiCl_3$ and 0.25 g. of hydrated diethylamine ($H_2O/(C_2H_5)_2NH$ molar ratio=0.5) in 25 ml. anhydrous benzene and then adding 4.0 of $Al(C_2H_5)_3$, is introduced into a 4-liter autoclave, maintained at 75° C. by means of hot oil circulation, and also containing 1.5 liters of heptane, which has been dehydrated on $Al_2O_3$. Propylene is then introduced into the autoclave and the polymerization is continued for five hours while maintaining a constant pressure of 7 atm. The polymer is discharged from the autoclave, washed with methanol, acidified with hydrochloric acid and then washed again with pure methanol. It then is dried under vacuum and weighed.

600 g. of polypropylene, having an intrinsic viscosity (determined in tetrahydronaphthalene at 135° C.) of 4.3 and a residue after heptane extraction of 83.0%, are thus obtained.

In a similar run, carried out using 0.25 g. of anhydrous diethylamine, only 350 g. of polypropylene, having an intrinsic viscosity (determined in tetrahydronaphthalene at 135° C.) of 4.2 and a residue after heptane extraction of 84.2%, are obtained.

The alpha-olefins which may be homopolymerized or mixtures of which may be copolymerized according to the present invention include higher alpha-olefins of the formula $CH_2=CHR$, wherein R is a hydrocarbon radical, particularly hydrocarbon radicals containing from 2 to 6 carbon atoms, e.g., alpha-olefins such as propylene, butene-1, hexene-1, heptene-1, styrene, etc.

Many variations can, of course, be practiced without departing from the spirit of the present invention.

Having thus described the present invention, what it is desired to secure and claim by Letters Patent is:

1. A process for polymerizing higher alpha-olefins to polymers composed at least prevailingly of isotactic macromolecules in the presence of a catalyst comprising an aluminum trialkyl and a titanium trihalide, characterized in that a compound obtained by treating an organic nitrogen containing base selected from the group consisting of aliphatic diamines and pyridine, which base is present in an organic base/titanium trihalide ratio of from between 0.25:1 to 1:1, with an amount of water varying from 0.1 to 1 mole per mole of the nitrogen-containing base, is added to the catalyst prior to its use in said polymerization process.

2. A catalyst capable of promoting the polymerization of alpha-olefins containing (1) an aluminum trialkyl, (2) a titanium trihalide and (3) a compound obtained by treating an organic nitrogen-containing base selected from the group consisting of aliphatic diamines and pyridine, which base is present in an organic base/titanium trihalide ratio of from between 0.25:1 to 1:1, with from 0.1 to 1 moles of water per mole of said organic base.

3. A process for polymerizing alpha-olefins according to claim 1, characterized in that propylene is used as the alpha-olefin.

4. A process for polymerizing alpha-olefins according to claim 1, characterized in that butene-1 is used as the alpha-olefin.

5. A process for polymerizing alpha-olefins according to claim 1, characterized in that the catalyst employed possesses a molar ratio of $H_2O$ to the organic base of from 0.25:1 to 1.00:1.

6. A process for polymerizing alpha-olefins according to claim 5, characterized in that the molar ratio of $H_2O$ to the organic base is 0.5:1.

7. A process for polymerizing alpha-olefins according to claim 1, characterized in that pyridine is used aus the organic base.

8. A process for polymerizing alpha-olefins according to claim 7, characterized in that the catalyst comprises $Al(C_2H_5)_3$, $TiCl_3$ and a compound obtained by treating pyridine with water.

9. A process for polymerizing alpha-olefins according to claim 8, wherein the compounds which form the catalyst are present in the following molar ratio: $H_2O$/pyridine between 0.25:1 and 1.00:1; pyridine/$TiCl_3$ between 0.25:1 and 1.00:1, and $TiCl_3$/$Al(C_2H_5)_3$ between 0.1:1 and 0.5:1.

10. A process for polymerizing alpha-olefins according to claim 1, characterized in that diethylamine is used as the organic base.

11. A process for polymerizing alpha-olefins according to claim 10, characterized in that the catalyst comprises $Al(C_2H_5)_3$, $TiCl_3$ and a compound obtained by treating diethylamine with water.

12. A process for polymerizing alpha-olefins according to claim 11, wherein the compounds which form the catalyst are present in the following molar ratios: $H_2O$/diethylamine between 0.25:1 and 1.00:1; diethylamine/$TiCl_3$ between 0.25:1 and 1.00:1; $TiCl_3$/$Al(C_2H_5)_3$ between 0.1:1 and 1.5:1.

13. A catalyst according to claim 2, which is prepared in the presence of a hydrocarbon solvent.

14. A catalyst according to claim 13, which is prepared in the presence of anhydrous benzene.

15. A catalyst according to claim 13, which is prepared in the presence of n-heptane.

16. A process for polymerizing alpha-olefins according to claim 8, wherein the compounds which form the catalyst are present in the following molar ratio $H_2O$/pyridine 0.5:1; pyridine/$TiCl_3$ 0.5:1; and $TiCl_3$/$Al(C_2H_5)_3$ between 0.15:1 and 0.3:1.

17. A process for polymerizing alpha-olefins according to claim 11, wherein the compounds which form the catalyst are present in the following molar ratios $H_2O$/diethylamine 0.5:1; diethylamine/$TiCl_3$ 0.5:1; and $$TiCl_3/Al(C_2H_5)_3$$

between 0.15:1 and 0.3:1.

References Cited by the Examiner
UNITED STATES PATENTS 2,984,658   5/61   Seydel et al. _____ 260—94.6

FOREIGN PATENTS 809,717   3/59   Great Britain.
820,261   9/59   Great Britain.

JOSEPH L. SCHOFER, *Primary Examiner.*

M. LIEBMAN, *Examiner.*